United States Patent [19]
Thewes et al.

[11] Patent Number: 6,166,565
[45] Date of Patent: *Dec. 26, 2000

[54] CIRCUIT FOR COMPARING TWO ELECTRICAL QUANTITIES

[75] Inventors: Roland Thewes, Puchheim; Stefan Prange, München; Erdmute Wohlrab, München; Werner Weber, München, all of Germany

[73] Assignee: Siemens Aktiengesellschaft, Munich, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/973,348
[22] PCT Filed: Jun. 3, 1996
[86] PCT No.: PCT/DE96/00971
§ 371 Date: Dec. 4, 1997
§ 102(e) Date: Dec. 4, 1997
[87] PCT Pub. No.: WO96/42049
PCT Pub. Date: Dec. 27, 1996

[30] Foreign Application Priority Data

Jun. 9, 1995 [DE] Germany .............. 195 21 091

[51] Int. Cl.[7] ...................................... H03K 5/22
[52] U.S. Cl. .................. 327/67; 327/65; 327/198
[58] Field of Search .................. 327/63, 65, 67, 327/198, 200, 208, 210–212, 215

[56] References Cited

U.S. PATENT DOCUMENTS

| | | | |
|---|---|---|---|
| 3,950,636 | 4/1976 | Dao | 235/164 |
| 4,247,791 | 1/1981 | Rovell | 327/52 |
| 5,821,792 | 10/1998 | Miwa | 327/215 |
| 5,854,562 | 12/1998 | Toyoshima et al. | 327/55 |

OTHER PUBLICATIONS

Patent Abstracts of Japan, vol. 13, No. 439, (E–827), Oct. 3, 1989 & JP 01 166612, Jun. 30, 1989, Hitachi, Ltd., N. Hiroko et al, Comparator.

IEEE International Symposium on Circuits & Systems, Seattle, Apr. 30–May 3, 1995, vol. 1, Institute of Electrical & Electronics Engineers XP000583173, Hidalgo–Lopez, J A et al, New Types of Digital Comparators, pp. 29–32.

IEEE Transactions on Electron Devices, vol. 39, No. 6, Jun. 1992, XP000271791, T. Shibata et al, A Functional MOS Transistor Featuring Gate–Level Weighted Sum & Threshold Operations, pp. 1444–1455.

IEEE Transactions on Electron Devices, vol. 40, No. 5, May 1993, XP000364271, T. Shibata et al, Neuron MOS Binary–Logic Integrated Circuits, Part II: Simplifying Techniques of Circuit Configuration and their Practical Applications, pp. 974–979.

IEICE Transactions on Fundamentals of Electronics, Communica–tions & Computer Sciences, vol. E75–A, No. 7, Jul. 1992, K. Tsukano et al, A New CMOS Neuron Circuit Based on a Cross–Coupled Current Comparator Structure, pp. 937–943.

(List continued on next page.)

*Primary Examiner*—Kenneth B. Wells
*Attorney, Agent, or Firm*—Schiff Hardin & Waite

[57] ABSTRACT

The circuit arrangement has two electrical quantities in the form of a first quadrature-axis current component ($I_1$) and of a second quadrature-axis current component ($I_2$) that are compared to one another. The circuit arrangement has a first inverter unit ($n_1$, $p_1$) and a second inverter unit ($n_2$, $p_2$). Respectively one output (50, 52) of the two inverter units (($n_1$, $p_1$), ($n_2$, $p_2$)) are coupled to an input of the respectively other inverter unit (52, 53). A reset unit (5) that initiates the comparison of the currents when activated is located between the two outputs of the two inverter units ($n_1$, $p_2$). When the reset unit (5) is deactivated, the output datum obtained in the evaluation remains stable.

11 Claims, 7 Drawing Sheets

OTHER PUBLICATIONS

IEEE Proceedings of the International Symposium on Multiple Valued Logic, XPO00400346, May 1993, B.A. Taheri, CMOS Implementation & Fabrication of the Pseudo Analog Neuron, pp. 266–270.

Alta Frequenza, vol. XXXXVIII, No. 11, Nov. 1969, D. Ferrari et al, Some New Schemes for Parallel Multipliers, pp. 843–852.

U. Tietze, Ch. Schenk, Halbleiterschaltungstechnik, 9 Auflage, Springer–Verlag, 1990, pp. 132–143.

6,166,565

CIRCUIT FOR COMPARING TWO ELECTRICAL QUANTITIES

BACKGROUND OF THE INVENTION

The job of comparing two electrical quantities to one another occurs in many fields of technology. For example, these comparisons are thus a foundation of electrical mensuration technology. Threshold equations can also be technically realized with the assistance of evaluator circuits.

Methods that compare electrical quantities with the assistance of operational amplifiers are known and are often employed (U. Tietze, Ch. Schenk, Halbleiterschaltungstechnik, 9th Edition Springer Verlag, 1990, pages 132 through 143). A significant disadvantage of these methods is comprised in the conversion of static dissipated power and in the comparatively large space requirement of such circuits, particularly when a great number of them are required. A further possibility of implementing an evaluation of two electrical quantities is comprised in the employment of a neuron MOS inverter, whereby the reference quantity to which another electrical quantity is to be compared is determined by the switching threshold of the neuron MOS inverter (T. Shibata and T. Ohmi, "A function MOS Transistor featuring gate-level weighted sum and threshold operations", IEEE Trans. Electron Devices, 39, 1992, pages 1444–1455). The employment of a neuron MOS inverter in this context exhibits a number of disadvantages. A static quadrature-access current component for all potentials flows on the floating gate $\phi_F$ with $V_{SS}+V_{th,n}<\phi^F<V_{DD}-V_{th,p}$, this corresponding to the normal case during operation as threshold gate. Moreover, it is necessary to govern the technology parameters extremely well, so that the threshold dimensioning corresponds to the desired behavior, i.e. that narrow tolerances of the threshold voltage must be adhered to.

A circuit arrangement for the comparison of two electrical currents wherein two co-coupled inverter units are provided is disclosed by (J. A. Hidalgo-Lopez et al., New Types of Digital Comparators, IEEE Internat. Symposium of Circuits and Systems (ISCAS), Seattle, April 30 through May 3, 1995, Vol. 1, pp. 29–32). The electrical quantities to be compared are respectively impressed at the outputs of the inverter units. The source terminals of the two inverter units are connected to one another and are connected to ground via a clock transistor.

U.S. Pat. No. 3,950,636 discloses two comparison units provided in a multiplier cell.

SUMMARY OF THE INVENTION

The invention is based on the problem of comparing two electrical quantities to one another, while avoiding the disadvantages of known methods described above.

In general terms the present invention is a circuit arrangement for the comparison of two electrical quantities. A first current source is provided that supplies a first quadrature-axis current component that flows through a first inverter unit. The first current source is connected to a source terminal of the first inverter unit. A reference current source is provided that supplies a second quadrature-axis current component that flows through a second inverter unit. The reference current source is connected to a source terminal of the second inverter unit. The first inverter unit at the second inverter unit are co-coupled. An output of the first inverter unit is connected to an input of the second inverter unit and an output of the second inverter unit is connected to an input of the first inverter unit. A reset unit is provided for compensating a difference in potential between an output potential of the first inverter unit and an output potential of the second inverter unit. The output signal of the first inverter unit describes a comparison result of the first quadrature-axis current component to the second quadrature-axis current component.

Advantageous developments of the present invention are as follows.

The first inverter unit and the second inverter unit are constructed of MOS field effect transistors.

The reset unit is composed of an MOS field effect transistor that is controlled by a control signal $\phi$. A first terminal of the reset unit is connected to the input of the second inverter unit. A second terminal of the reset unit is connected to the input of the first inverter unit. A gate terminal of the reset unit is coupled with the control signal $\phi$.

The first current source is composed of a first neuron MOS transistor.

The reference current source is composed of a second neuron MOS field effect transistor having the same polarity as the first neuron MOS transistor.

Two gate terminals are provided in the second neuron MOS field effect transistor. A first gate terminal is applied to a first operating potential. A second gate terminal is applied to a second operating potential. The second quadrature-axis current component is defined by the size ratio of the capacitance to source terminals of the first terminal and of the second gate terminal of the second neuron MOS field effect transistor.

At least one additional gate terminal is provided in the second neuron MOS field effect transistor for the fine adjustment of the reference current.

The reference current source is composed of a MOS field effect transistor having the polarity of the first neuron MOS field effect transistor.

A unit is provided that generates the reference current source internally in the chip.

An additional unit is provided at the output of the first inverter unit and the output of the second inverter unit for buffering the output potential of the first inverter unit and/or the output potential of the second inverter unit.

An additional unit is provided at the output of the first inverter unit or the output of the second inverter unit for buffering the output potential of the first inverter unit and/or the output potential of the second inverter unit.

The present invention is also a binary multiplier cell having two circuit arrangements for the operation of a multiplier bit, of a multiplicand bit, of a sum bit of a preceding partial product and of a carry bit of a preceding partial product as input potentials to form an output sum bit, an output carrier bit, a negated output sum bit and a negated carry bit. A first evaluation circuit for the comparison of electrical quantities and a second evaluation circuit for the comparison of electrical quantities are provided, whereby the first evaluation circuit is provided for the calculation of the output carry bit and the second evaluation circuit is provided for the calculation of the output sum bit. A third neuron MOS field effect transistor is provided for the realization of the reference current source of the first evaluation circuit. A fourth neuron MOS field effect transistor is provided for the realization of the reference current source of the second evaluation circuit. A first evaluation transistor is provided for the realization of the first current source of the first evaluation circuit. A second evaluation transistor is provided for the realization of the first current source of the second evaluation circuit. The four input potentials are applied to the gate terminals of the third neuron MOS field effect transistor and to the gate terminals of the fourth neuron MOS field effect transistors. The negated output carry bit is connected to a fifth gate terminal of the fourth neuron MOS field effect transistor. The two neuron MOS field effect transistors are realized such that the input potentials are differently weighted for the third neuron MOS field effect transistor and the fourth neuron MOS field effect transistor corresponding to the threshold equation employed for the output sum bit and the threshold equation employed for the output carry bit.

The circuit arrangement has a number of advantages. Since the evaluation ensues via currents and not, as is often standard in other evaluator circuits, via charges, this circuit arrangement is more rugged with respect to the emission of noise signals and allows a more reliable evaluation than the principle of charge evaluation. For example, narrow tolerances for the threshold formation can thus be adhered to in the realization of threshold equations. A further advantage is comprised therein that the output signal is present complementary at two outputs, whereby full CMOS boost is achieved with good driver capability. In many applications, this factor saves an inverter for generating the inverted signal or complicated driver circuits. Further, the circuit arrangement has storing properties, which can be advantageously utilized in circuit architectures with pipe lining. Another advantage of this circuit arrangement is comprised therein that no quadrature-axis current component flows in the quiescent condition. The fact that only one control line is required is advantageous, particularly in array circuits. The dimensioning of the circuit is uncritical due to the high stability of the circuit. The realization can usually ensue with minimal transistors. Together with the low number of transistors, this leads to a favorable area requirement for the overall circuit within an integrated circuit. Moreover, the circuit flips into a stable condition very fast, it following therefrom that the circuit is very well-suited for high-frequency circuits.

Shown are:

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

The inventive circuit arrangement is explained in greater detail with reference to FIGS. 1–10.

Figure 1:
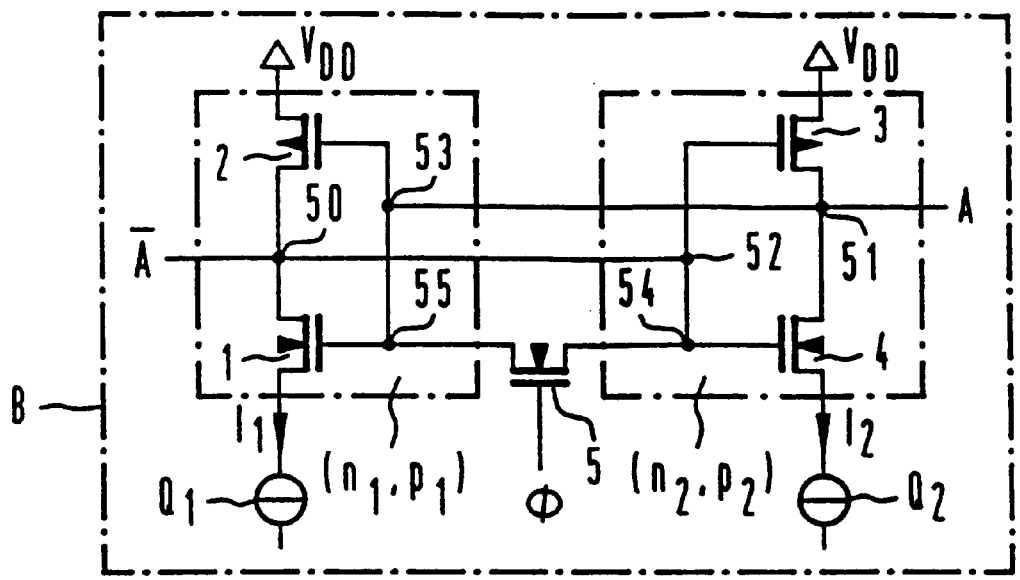
FIG. 1 a drawing that shows the inventive circuit arrangement.

FIG. 1 describes a circuit arrangement B for realizing evaluations of two electrical quantities. Two quadrature-axis current components $I_1$ and $I_2$ generated by two current sources, the first current source $Q_1$ and the second current source $Q_2$, are to be compared to one another in such a way that an operating potential $V_{DD}$ is adjacent at an output 51 of a second inverter unit ($n_2$, $p_2$) when the first quadrature-axis current component $I_1$ is greater than the second quadrature-axis current component $I_2$. In this case, the potential of zero volts is adjacent at an output 50 of a first inverter stage ($n_1$, $p_1$).

The circuit arrangement is composed of the first inverter stage ($n_1$, $p_1$) having an n-channel MOS field effect transistor 1 and a p-channel MOS field effect transistor 2 through which the first quadrature-axis current component $I_1$ flows. The second quadrature-axis current component $I_2$ flows through the second inverter stage ($n_2$, $p_2$). The output 50 of the first inverter stage ($n_1$, $p_2$) is connected to the input 52 of the second inverter stage ($n_2$, $n_2$). The output 51 of the second inverter stage ($n_2$, $p_2$) is connected to the input 53 of the first inverter stage ($n_1$, $p_1$). The input 53 of the first inverter stage ($n_1$, $p_1$) is also connected to a second terminal 55 of a reset unit 5. A first terminal 54 of the reset unit 5 is connected to the input 52 of the second inverter unit ($n_2$, $p_2$). The difference in potential between a first output potential A that is adjacent at the output 51 of the second inverter unit ($n_2$, $p_2$) and a second output potential $\overline{A}$ that is adjacent at the output 50 of the first inverter unit ($n_1$, $p_1$) is compensated via a control signal $\phi$ at the gate terminal of the reset unit 5.

For explaining the function of the circuit arrangement B, it is assumed that identical potential initially prevails at the output 51 of the second inverter unit ($n_1$, $p_2$) and at the output 50 of the first inverter unit ($n_1$, $p_1$). When the first quadrature-axis current component $I_1$ is greater than the second quadrature-axis current component $I_2$, then a somewhat lower potential is adjacent at the output 50 of the first inverter unit ($n_1$, $p_1$) than at the output 51 of the second inverter unit ($n_1$, $p_2$). As a result thereof, the p-channel MOS field effect transistor 3 whose gate terminal is coupled to the output 50 of the first inverter unit ($n_1$, $p_1$) conducts better than the p-channel MOS field effect transistor 2, as a result whereof the potential at the output 51 of the second inverter unit ($n_2$, $p_2$) is boosted until the operating potential $V_{DD}$ is ultimately reached. Correspondingly, a potential of zero volts is ultimately achieved at the output 50 of the first inverter unit ($n_1$, $p_1$). A stable condition of the circuit arrangement is thus achieved.

When a second quadrature-axis current component $I_2$ that is greater than the first quadrature-axis current component $I_1$ flows through the second inverter unit ($n_2$, $p_2$) at the point-in-time of the evaluation, then—corresponding to the process described above—a potential of zero volts is established at the output 51 of the second inverter unit ($n_2$, $p_2$) and an operating potential $V_{DD}$ is established at the output 50 of the first inverter unit ($n_1$, $p_1$).

The circuit has a very high internal amplification during the evaluation event and has a good driver capability after the conclusion of the evaluation event and can therefore be operated at high frequencies.

Before a new evaluation can ensue, the difference of potential between the first output potential A and the second output potential $\overline{A}$ must be compensated, i.e. the circuit arrangement must be reset. This occurs with a reset unit 5 realized by an n-channel MOS of field effect transistor that is controlled via a control signal φ. Instead of an n-channel MOS field effect transistor, it is also possible to employ a p-channel MOS field effect transistor in order to realize the reset unit.

Dependent on asymmetrical loads at the output 51 of the second inverter unit ($n_2$, $p_2$) or, respectively, at the output 50 of the first inverter unit ($n_1$, $p_1$), the charge compensation can lead to a compensation at high or low level. When an n-channel MOS field effect transistor is employed for realizing the reset unit 5, then a good compensation of the two output potentials A and $\overline{A}$ ensues at low and medium level. The compensation may be incomplete under certain circumstances at high levels close to the operating potential $V_{DD}$. The MOS field effect transistors 2 and 3 then conduct poorly but the MOS field effect transistors 1 and 4 conduct well. This leads to a rapid drop of the potential to a lower level at which the n-channel MOS field effect transistor conducts better and can produce the compensation of potential. An analogous argumentation given employment of a p-channel MOS field effect transistor instead of the n-channel MOS field effect transistor for realization of the reset unit 5 also leads to a good compensation of the potentials at the output 50 of the first inverter unit ($n_1$, $p_1$) an the output 51 of the second inverter unit ($n_2$, $p_2$). The new evaluation that leads to new values at the outputs begins when the control signal φ is turned off.

Figure 2:
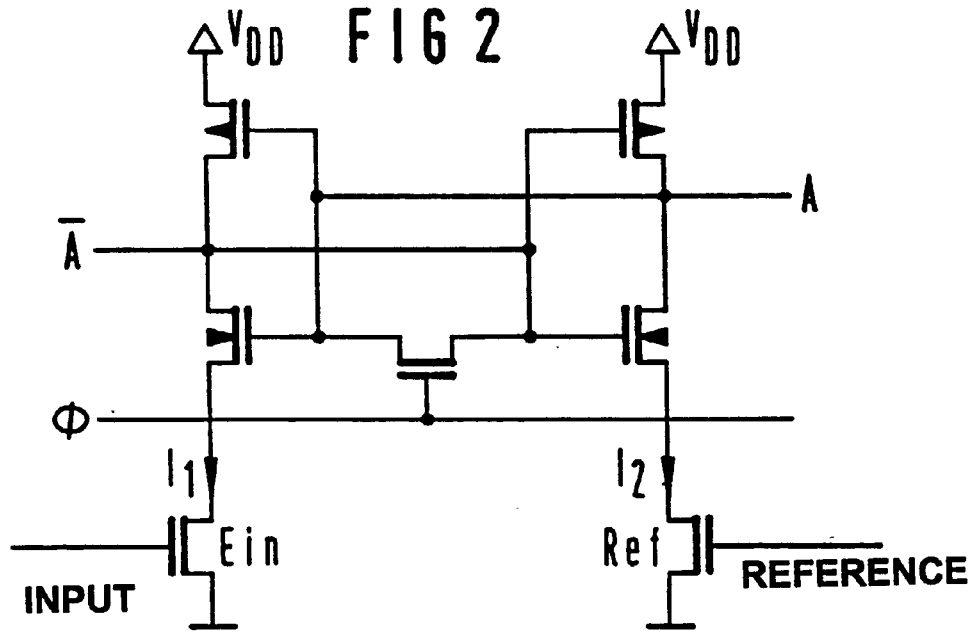
FIG. 2 a sketch of a circuit arrangement in which the evaluator circuit of FIG. 1 compares two electrical quantities to one another, these being respectively formed by a MOS field effect transistor.

As shown in FIG. 2, the circuit arrangement B can also compare a difference in potential between an input potential and a reference potential, the realization of a threshold equation, for example being possible as a result thereof. When a potential at a gate terminal of a first MOS field effect transistor Ein is greater than a reference potential at a second neuron MOS transistor Ref and when the drain current of the first MOS field effect transistor Ein forms the first quadrature-axis current component $I_1$ and the drain current of the second MOS field effect transistor Ref forms the second quadrature-axis current component $I_2$ in the circuit arrangement B, then the first quadrature-axis current component $I_1$ flows through the circuit arrangement B, this being higher than the second quadrature-axis current component $I_2$, the reference current in this context. The circuit arrangement B changes into a defined condition according to the above-described functionality of the circuit arrangement B. The output condition thus directly represents an evaluation of the input potentials.

Figure 3:
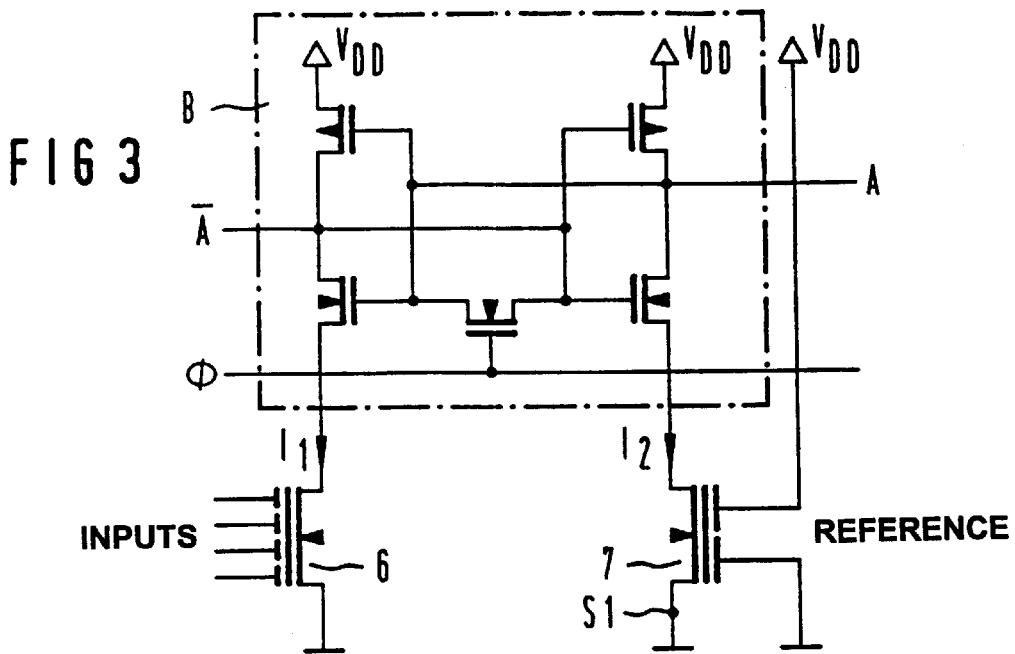
FIG. 3 a sketch of a circuit in which the evaluator circuit of FIG. 1 compares two electrical quantities to one another, these being respectively formed by a neuron MOS field effect transistor.

As shown in FIG. 3, the first current source $Q_1$ can also be realized with a neuron MOS field effect transistor 6 at whose gate terminals specific input potentials are applied. The gate capacitances of the non-MOS field effect transistor 6 can be dimensioned corresponding to the input potentials. The source terminal of the neuron MOS field effect transistor 6 is applied to the second operating potential $V_{SS}$.

The reference current source $Q_2$ is realized by the neuron MOS field effect transistor 7. A first gate terminal 60 of the neuron MOS field effect transistor 7 is applied to the operating potential $V_{DD}$. A second gate terminal 61 as well as the terminal S1 of the neuron MOS field effect transistor is applied to a ground potential. The reference current $I_2$ can thus be set via the dimensioning of the gate capacitances of the two gate terminals 60 and 61 of the neuron MOS field effect transistor 7.

Here, the evaluation occurs via the quadrature-axis current components that flow through the neuron MOS transistors 6 and 7. This evaluation is rugged relative to the emission of noise signals and thus allows a more reliable evaluation than the principle of charge evaluation, as standard, for example in read amplifiers of memories. Narrow tolerances for a threshold formation can thus be adhered to. Slight differences in potential at the floating gate of 20 millivolts can thus still be reliably discriminated and correctly evaluated.

The output signal is present in complementary form at two outputs, whereby full boost with good driver capability is achieved. In many applications, one thus saves an inverter for generating the inverted signal or involved driver circuits. Moreover, the output 50 of the first inverter unit ($n_1$, $p_1$) and the output 51 of the second inverter unit ($n_2$, $p_2$) have storing properties, which can be advantageously utilized in circuit architectures having pipe lining.

Figure 4:
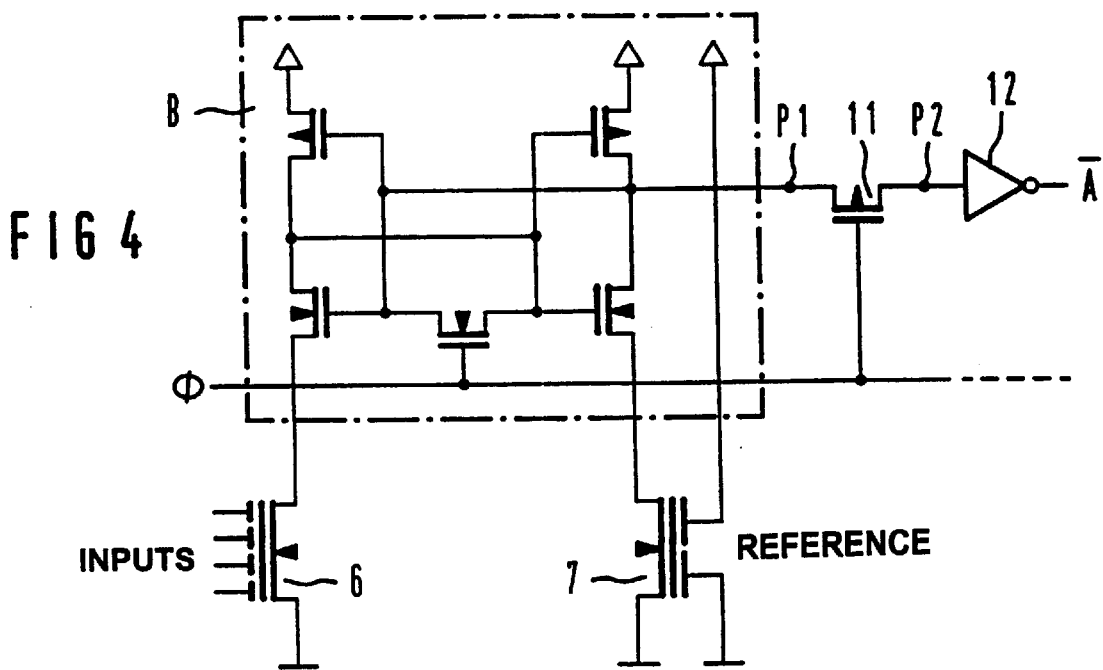
FIG. 4 a sketch of a circuit in which the evaluator circuit of FIG. 1 compares two electrical quantities to one another that are respectively formed by a neuron MOS field effect transistor, whereby the output of the evaluator circuit is additionally decoupled.

For buffering the output signals of the circuit arrangement B, a buffer unit 11, 12 can be additionally provided at at least one output of the circuit arrangement B. as shown in FIG. 4. This, for example can be constructed of an inverter 12 and of a transfer transistor 11. The gate terminal of the transfer transistor 11 is thereby coupled to the control signal φ. The terminal P1 of the transfer transistor 11 is coupled to the output signal of the circuit arrangement B. The terminal P2 of the buffer transistor 11 is connected to an input of the inverter 12.

The transfer transistor 11 is deactivated given the resetting of the circuit arrangement B, i.e. given the activated control signal φ. The value of the preceding output potential A thus remains stored on an input capacitance of the inverter 12. Correspondingly, the inverter value of the output potential A, i.e. $\overline{A}$, is preserved at the output of the inverter 12. When the control signal φ is deactivated, the transfer transistor 11 is conductive and the value of the new output potential A is now connected through to the input of the inverter 12. This value is inverted by the inverter 12, so that the inverted value of the output potential A i.e. $\overline{A}$, is present buffered.

No quadrature-axis current component flows in the circuit arrangement B in the quiescent condition. This is an important advantage over many other evaluator circuits. Further, only one control signal φ is needed, this being advantageous for array circuits.

Figure 5:
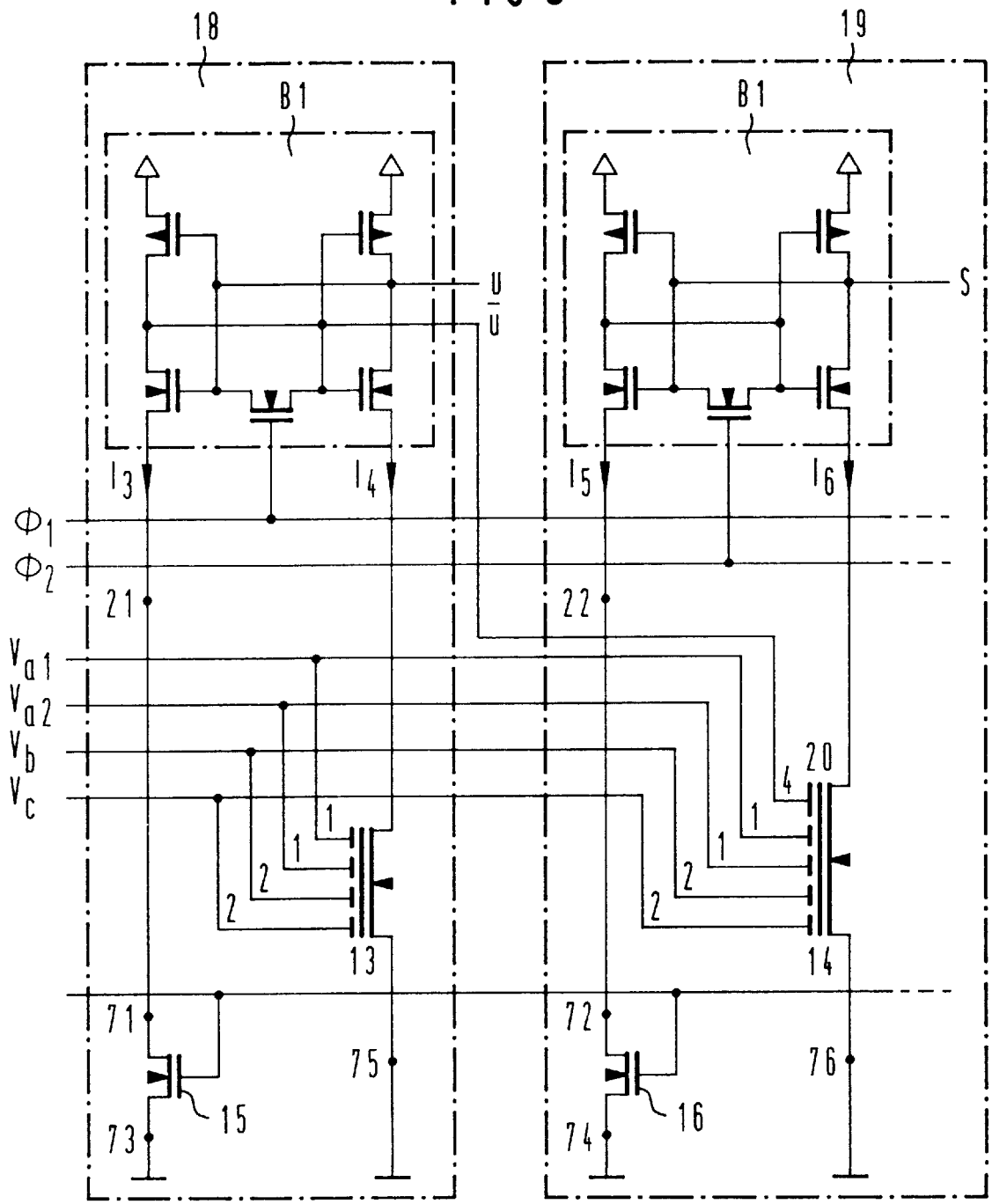
FIG. 5 a sketch that describes the application of the evaluator circuit for realizing a multiplier cell upon application of neuron MOS field effect transistors.

FIG. 5 shows an application of the circuit arrangement B. Here, a first evaluation circuit B1 and a second evaluation circuit B2 with a third neuron MOS transistor 13 and a fourth neuron MOS transistor 14 and a first evaluation transistor 15 and a second evaluation transistor 16 are connected in such a way that the overall circuit represents the function of a multiplier cell. The gate terminals of the third and of the fourth neuron MOS transistors 13 and 14 are respectively connected to the input potentials $V_{a1}$, $V_{a2}$, $V_b$ and $V_c$ of the circuit. The input potential $V_{a1}$ thereby represents a multiplier bit and the input potential $V_{a2}$ represents a multiplicand bit that are both processed in the multiplier cell. The potential $V_b$ represents the sum bit of a preceding partial product. The input potential $V_c$ represents the carry bit of a preceding partial product. The input potentials $V_{a1}$, $V_{a2}$, $V_b$ and $V_c$ are weighted at the third and the fourth neuron MOS transistor 13 and 14 in such a way that the input potentials $V_{a2}$ and $V_2$ are singly weighted and $V_b$ and $V_c$ are doubly weighted relative thereto.

By comparing the reference current $I_3$ to the quadrature-axis current component $I_4$ flowing through the third neuron MOS field effect transistor 13, the first evaluator circuit B1, which is connected via a control transistor 23 to a gate terminal of the control transistor 23 with a control signal $\phi_1$, forms the value of the output carry bit u of the multiplier cell. The function of the first evaluation circuit B1 and of the second evaluation circuit B2 is unmodified compared to the circuit arrangement B set forth above.

The comparison of the input currents $I_3$ and $I_4$ by the first evaluation circuit B1, of the reference current $I_3$ to the quadrature-axis current component $I_4$ flowing through the neuron MOS transistor 13 represents a technical realization of a threshold equation. The logical value of the output carried bit u of the first evaluation circuit B1 is logical 1 when and only when the quadrature-axis current component $I_4$ is greater than the reference current $I_3$. With the above-described weighting of the input signals at the gate terminals of the third neuron MOS transistor 13 and of a reference $I_3$, which represents a logical value 3, 5, the sub-circuit arrangement 18 represents the following threshold equation overall:

$a_1+a_2+2b=2c>3, 5.$ $a_1$ and $a_2$ thereby represent the multiplier bit and the multiplicand bit that are processed in the multiplier cell. The sum bit of a preceding partial product is represented by b. The carry bit of a preceding partial product is identified by the symbol c.

The sub-circuit arrangement 19 of the multiplier cell forms the output sum bit of the multiplier cell from the above-described input potentials and the negated output carry bit $\bar{u}$ of the sub-circuit arrangement 18 described above. The negated output carry bit represented by the output $\bar{u}$ is thereby weighted with the value 4 and is connected to a fifth gate terminal 20 of the fourth neuron MOS transistor 14. The function of the sub-circuit arrangement 19 corresponds to that of the above-described sub-circuit arrangement 18 in such a way that it reference current $I_5$ is compared is compared to the quadrature-axis current component $I_6$ flowing through the fourth neuron MOS transistor 14. The threshold equation represented by this sub-circuit 19 reads:

$a_1+a_2+2b+2c+4\bar{u}>5.5.$

The reference current $I_5$, which represents a logical value of 5.5, is a quadrature-axis current component of the second evaluation transistor 16. The logical values that are represented by the reference currents $I_3$ and $I_5$ are then achieved via appropriate dimensionings of the evaluation transistors 15 and 16 that are realized by MOS field effect transistors.

The terminal 71 of the first evaluation transistor 15 is thereby connected to the input 21 of the first evaluation circuit B1. The terminal 72 of the second evaluation transistor 16 is connected to the input 22 of the evaluator circuit 17.

The gate terminals of the evaluation transistors 15 and 16 are coupled to a reference potential $V_{ref}$. The terminals 73 and 74 of the evaluation transistors 15 and 16 are coupled to the ground potential. The terminals 75 and 76 of the third neuron MOS field effect transistor 13 and of the fourth neuron MOS field effect transistor 14 are likewise coupled to the ground potential.

The MOS field effect transistor 23 of the sub-circuit arrangement 18 has its gate terminal coupled to the control signal $\phi_1$. When the MOS field effect transistor 23 becomes transmissive, the difference of potential between the negated output carry bit u and the output carry bit $\bar{u}$ is compensated. The same is correspondingly true of the MOS field effect transistor 24 that has its gate terminal coupled to a control signal $\phi_2$. The difference in potential between the negated output sum bit $\bar{s}$ and output sum bit s is compensated in the sub-circuit arrangement 19 by the MOS field effect transistor 24 when the MOS field effect transistor 24 becomes transmissive.

The following table recites a truth table for the binary multiplication for confirmation of the functioning of the multiplier cell described above.

| $a_1$ | $a_2$ | b | c | $\ddot{u}$ | s | $a_1/2+a_2/2+b+c$ | $a_1/2+a_2/2+b+c-2$ |
|---|---|---|---|---|---|---|---|
| 0 | 0 | 0 | 0 | 0 | 0 | 0 | 0 |
| 0 | 0 | 0 | 1 | 0 | 1 | 1 | 1 |
| 0 | 0 | 1 | 0 | 0 | 1 | 1 | 1 |
| 0 | 0 | 1 | 1 | 1 | 0 | 2 | 0 |
| 0 | 1 | 0 | 0 | 0 | 0 | 0.5 | 0.5 |
| 0 | 1 | 0 | 1 | 0 | 1 | 1.5 | 1.5 |
| 0 | 1 | 1 | 0 | 0 | 1 | 1.5 | 1.5 |
| 0 | 1 | 1 | 1 | 1 | 0 | 2.5 | 0.5 |
| 1 | 0 | 0 | 0 | 0 | 0 | 0.5 | 0.5 |
| 1 | 0 | 0 | 1 | 0 | 1 | 1.5 | 1.5 |
| 1 | 0 | 1 | 0 | 0 | 1 | 1.5 | 1.5 |
| 1 | 0 | 1 | 1 | 1 | 0 | 2.5 | 0.5 |
| 1 | 1 | 0 | 0 | 0 | 1 | 1 | 1 |
| 1 | 1 | 0 | 1 | 1 | 0 | 2 | 0 |
| 1 | 1 | 1 | 0 | 1 | 0 | 2 | 0 |
| 1 | 1 | 1 | 1 | 1 | 1 | 3 | 1 |

Instead of being undertaken by a neuron MOS field effect transistor (see FIG. 3), a reference formation for generating the second quadrature-axis current component $I_2$ can also be globally undertaken for a plurality of circuit arrangements B, as shown in FIG. 5. This requires the externally supplied or internally generated reference potential $V_{Ref}$. This can be advantageous when a fine adjustment of the reference current $I_2$ is desirable. Over and above this, the space requirement of the circuit is considerably reduced in this way, since the space requirement of MOS field effect transistors is clearly less then the space requirement of neuron MOS field effect transistors. Circuits for the internal generation of the reference potential $V_{ReF}$ and, thus, for every inventive circuit arrangement to which the reference potential $V_{Ref}$ is inventively applied, as well as of the second quadrature-axis current component $I_2$ are shown in FIGS. 6–11 and are explained below. What all circuits described below have in common is that a neuron MOS field effect transistor M1 is employed for generating a second reference current $I_{Ref}$. The second reference current $I_{Ref}$ is fed via a current mirror circuit into a MOS field effect transistor M2 that is operated as current-potential converter. The MOS field effect transistor M2 makes a reference potential $V_{Ref}$ available at the terminals 80 and 81. As warranted, the resulting reference potential $V_{Ref}$ can be buffered by an operational amplifier. The circuits shown in FIGS. 6–11 allow a very exact setting of the reference potential, even given greatly different thicknesses of the dielectrics of neuron MOS field effect transistors and MOS field effect transistors.

For the more exact setting of the switching threshold, at least one additional gate terminal can be provided in the case of neuron MOS transistors. A fine adjustment of the switching threshold corresponding to the coupling capacitance of the additional gate terminal being capable of being implemented therewith.

Over and above this, the space requirement of the overall circuit is substantially reduced when the reference terminal is used for a plurality of circuit arrangements B.

Figure 6:
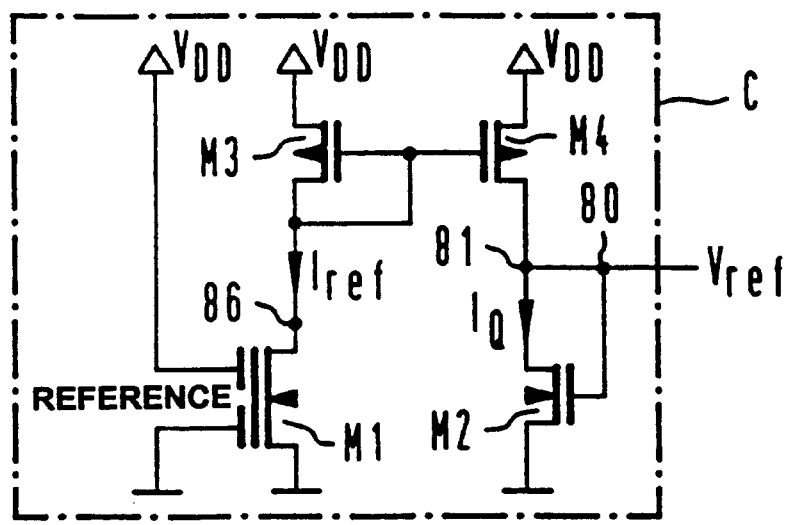
FIGS. 6–11 show possible circuit arrangements for generating a reference current internally in the chip.

In the circuit arrangement C shown in FIG. 6, p-MOS-field effect transistors M3 and M4 form a current mirror. M3 thereby converts a second reference current $I_{Ref}$ generated by the neuron MOS field effect transistor M1 into an equivalent gate potential. Since M4 is likewise operated with this gate potential, a further quadrature-axis current component $I_Q$ flows through M4, this being approximately equal to the second reference current $I_{Ref}$ and being impressed on a MOS field effect transistor M2. This converts the further quadrature-axis current component $I_Q$ into an equivalent gate potential. The equivalent gate potential represent the reference potential $V_{Ref}$ that can be employed in the inventive circuit arrangement.

Figure 7:
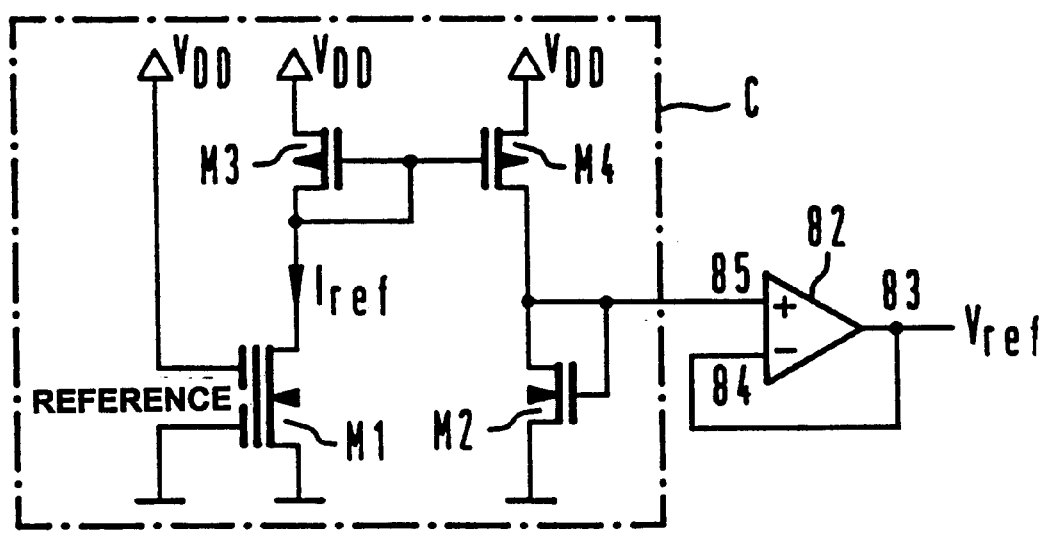

In order to design a reference potential generated by a circuit arrangement C described in FIG. 6 to be lower in impedance can, for thus, more rugged with respect to noise signals, the reference potential $V_{Ref}$ is buffered upon employment of an operational amplifier 82 (see FIG. 7). In the operational amplifier 82, one output 83 is shorted to an inverting input 84 of the operational amplifier 82. The reference potential $V_{Ref}$ is applied to a non-inverting input 85 of the operational amplifier 82; the buffered reference potential $V_{Ref}$ is adjacent at the output 83 thereof.

Figure 8:
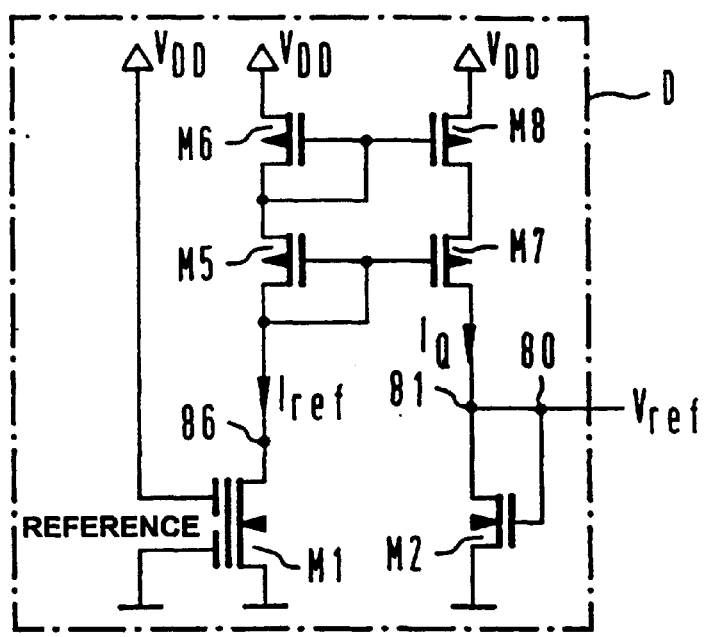

In a circuit arrangement B described in FIG. 8, a cascade current mirror formed of MOS field effect transistors M5, M6, M7 and M8 is employed instead of a simple current mirror composed of MOS field effect transistors M3 and M4. This current mirror has the advantage—compared to the simple current mirror described in FIG. 6—that the deviations between input current $I_{Ref}$ and output current $I_Q$ of the current mirror are substantially less. This enables a higher precision in the generation of the reference potential $I_{Ref}$.

The circuit arrangement D also harbors another advantage. The generation of the second reference current $I_{Ref}$ by the neuron MOS field effect transistor M1 is all the more exact the closer the value of the drain potential M1 lies to an average value of the neuron MOS field effect transistor of the drain potential $V_{DO}$ of an input transistor in a circuit according to FIG. 3 at the point-in-time of the evaluation. The value of the drain potential—relative to the operating potential $V_{DD}$—lies at not especially high values. Since the voltage drop between the operating potential $V_{DD}$ and the terminal 86 of the MOS field effect transistor M1 is higher in the circuit arrangement D than in the circuit arrangement C described in FIG. 6, a drain potential derives in FIG. 8 at the MOS field effect transistor M1 that lies closer to the average value $V_{DO}$ than in the circuit arrangement C described in FIG. 6.

Figure 9:
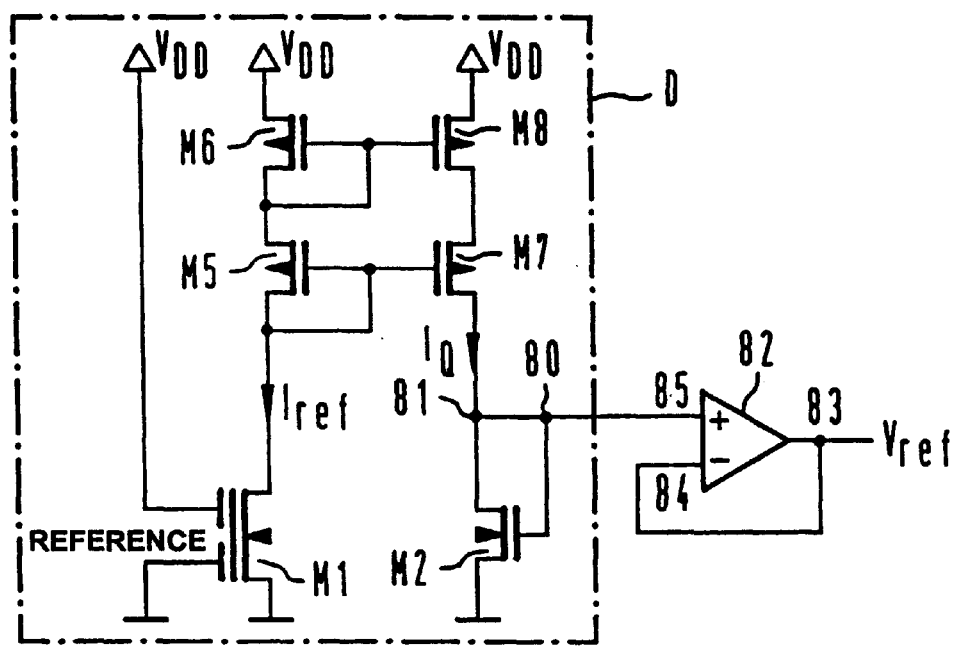

FIG. 9 represents the circuit arrangement D described in FIG. 8 with buffered reference potential $V_{Ref}$. The buffering of the reference voltage $V_{Ref}$ is implemented in the same way as described above.

Figure 10:
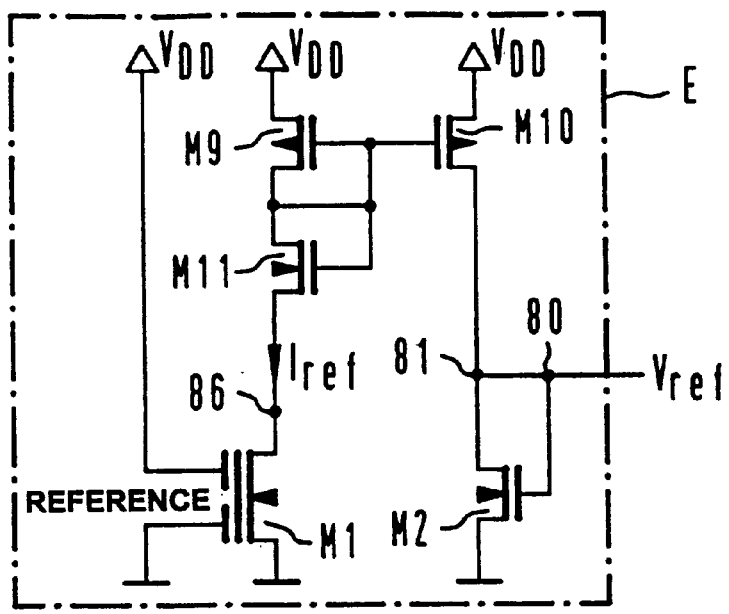

A simple current mirror, composed of the MOS field effect transistors M9 and M10, is again provided in the circuit arrangement E described in FIG. 10, as in the circuit arrangement C in FIG. 6. However, the MOS field effect transistor M11 located in the current path of the second reference current $I_{Ref}$ sees to a reduced drain potential of M1 compared to the circuit arrangement C shown in FIG. 6. The advantage of such a measure was explained above.

Figure 11:
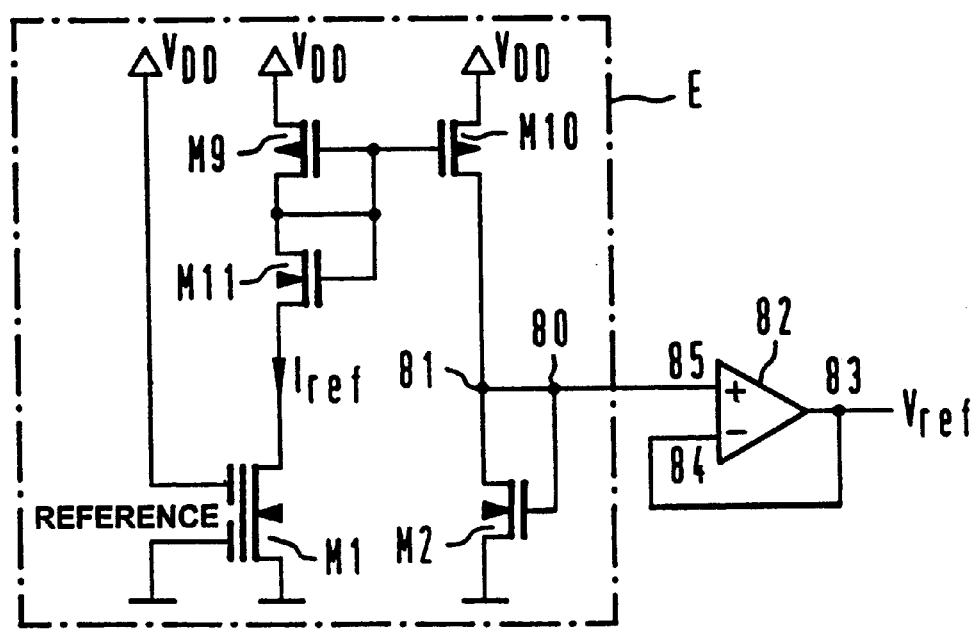

FIG. 11 represents the circuit arrangement E described in FIG. 10 with buffered reference voltage $V_{Ref}$. The buffering of the reference potential $V_{Ref}$ is implemented in the way described above.

Figure 12:
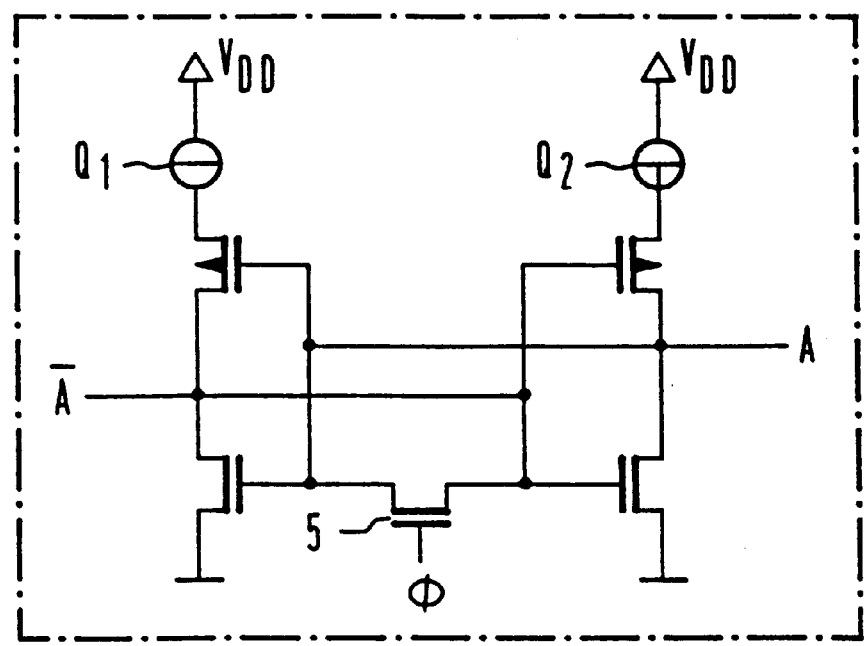
FIGS. 12 and 13 the structure of the inventive circuit arrangement when the first quadrature-axis current component $I_1$ and the second quadrature-axis current component $I_2$ are impressed via the operating potential $V_{DD}$.
Figure 13:
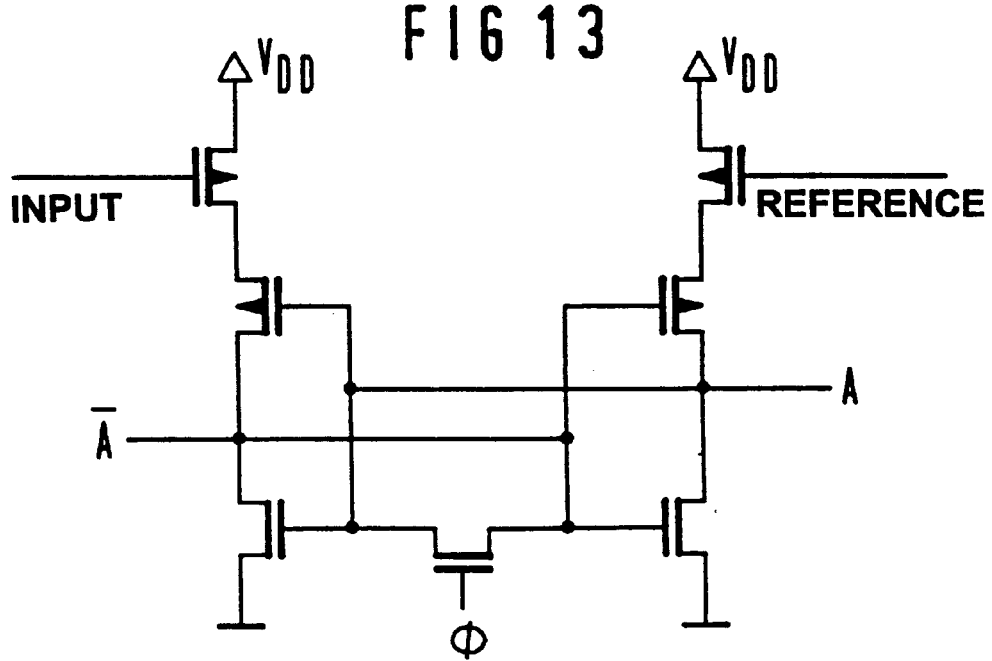

Another possibility for realizing the inventive circuit arrangement is comprised in impressing the first quadrature-axis current component ($I_1$) and the second quadrature-axis current component ($I_2$) via the operating potential $V_{DD}$. In this case, the circuit arrangements shown in FIGS. 12 and 13 derive.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A circuit arrangement for comparing two electrical quantities, comprising:

a first current source that supplies a first quadrature-axis current component that flows through a first inverter unit, the first current source being connected only to a source terminal of the first inverter unit;

a reference current source that supplies a second quadrature-axis current component that flows through a second inverter unit, the reference current source being connected only to a source terminal of the second inverter unit, wherein the first inverter unit and the second inverter unit are co-coupled an output of the first inverter unit is connected to an input of the second inverter unit, an output of the second inverter unit is connected to an input of the first inverter unit, and an output signal of the first inverter unit is indicative of a comparison result of the first quadrature-axis current component to the second quadrature-axis current component; and a single reset unit for providing exclusive compensation for a difference in potential between an output potential of the first inverter unit and an output potential of the second inverter unit, a control signal connected to the reset unit being used exclusively for control of the reset unit.

2. The circuit arrangement according to claim 1, wherein each of the first inverter unit and the second inverter unit are constructed of MOS field effect transistors.

3. The circuit arrangement according to claim 1, wherein the reset unit is composed of an MOS field effect transistor that is controlled by a control signal φ, and wherein a first terminal of the reset unit is connected to the input of the second inverter unit, a second terminal of the reset unit is connected to the input of the first inverter unit, and a gate terminal of the reset unit is coupled with the control signal φ.

4. The circuit arrangement according to claim 1, wherein the first current source is composed of a first neuron MOS transistor.

5. The circuit arrangement according to claim 4, wherein the reference current source is composed of a second neuron MOS field effect transistor having a polarity that is identical to a polarity of the first neuron MOS transistor.

6. The circuit arrangement according to claim 5, wherein the second neuron MOS field effect transistor has first and second gate terminals; wherein the first gate terminal is applied to a first operating potential and the second gate terminal is applied to a second operating potential; and wherein the second quadrature-axis current component is defined by a size ratio of capacitance to source terminals of the first terminal and of the second gate terminal of the second neuron MOS field effect transistor.

7. The circuit arrangement according to claim 6, wherein at least one additional gate terminal is provided in the second neuron MOS field effect transistor for adjustment of the reference current.

8. The circuit arrangement according to claim 4, wherein the reference current source is composed of a MOS field effect transistor having a polarity that is identical to a polarity of the first neuron MOS field effect transistor.

9. The circuit arrangement according to claim 8, wherein the arrangement further comprises a unit that generates the reference current source internally in a chip.

10. The circuit arrangement according to claim 1, wherein the arrangement further comprises a unit to which both the output of the first inverter unit and the output of the second inverter unit are connected for buffering at least one of an output potential of the first inverter unit and an output potential of the second inverter unit.

11. The circuit arrangement according to claim 1, wherein the arrangement further comprises a unit at one of the output of the first inverter unit or the output of the second inverter unit for buffering at least one of an output potential of the first inverter unit and an output potential of the second inverter unit.

* * * * *